United States Patent Office 3,256,260
Patented June 14, 1966

3,256,260
POLYMERIZATION OF ACETYLENIC
HYDROCARBONS
Michael Dubeck, Royal Oak, and Allen H. Filbey, Walled Lake, Mich., assignors to Ethyl Corporation, New York, N.Y., a corporation of Virginia
No Drawing. Filed Oct. 2, 1961, Ser. No. 142,026
13 Claims. (Cl. 260—94.1)

This invention relates to a method for preparation of high molecular weight materials from simple compounds. More specifically, it concerns a facile polymerization of acetylenic materials and new compositions of matter obtained thereby.

Previous investigators have found acetylene could be polymerized by a variety of methods. Various forms of energy will induce the polymerization. For example:

(a) Thermal energy (500° C.) will evoke the formation of benzene and a myriad of alkyl and aryl compounds, (b) Thermal energy and the presence of copper metal will form cuprene, (c) Alpha particles and cathode rays promote polymerization, (d) Ultraviolet light and high frequency electrical discharges likewise both cause polymerization.

In the presence of heat, pressure and tetrahydrofuran, cyclooctatetraene can be prepared from acetylene. Acetylene will form vinyl acetylene and then higher polymers when it is reacted in a copper chloride, ammonium chloride solution.

No previous investigator has polymerized acetylenes having a terminal triple bond using catalysts with nickel-carbon bonds. Zeiss and Tsutsui have polymerized disubstituted acetylenes; they obtained only cyclic products. Specifically, these workers have obtained aromatic systems via the Grignard reaction. Herrick and Sauer prepared monovinylacetylene by polymerizing acetylene with nickel chelate catalysts.

None of the processes of the prior art produce high polymers of acetylene which are soluble in organic solvents; nor do the prior art products have the new and useful properties of the compositions of matter formed by our process.

It is desired to polymerize acetylenic materials and to form novel compositions of matter using ordinary equipment, readily obtainable experimental conditions, with maximum controllability and with a high degree of safety. Therefore, it is an object of this invention to provide a process for the polymerization of acetylenic materials. It is a further object of this invention to provide new compositions of matter with new and useful properties, described more fully below. It is a further object of this invention to obtain soluble linear polyacetylenes, and it is another object of this invention to polymerize acetylenic materials with the aid of a nickel-containing catalyst.

In general, the objects of this invention are accomplished by reacting an acetylenic hydrocarbon, either acetylene itself or a monosubstituted derivative thereof, in the presence of a heterocyclic amine and a catalyst containing at least one nickel-carbon bond. The use of this invention results in the formation of new compositions of matter having novel and useful properties. The products are essentially linear polymers of acetylene, frequently having an average molecular weight of 1300. They are soluble in organic solvents, e.g., pyridine, benzene, carbon tetrachloride, chloroform, and the like. We prefer to use a temperature of 50 to 150° C., a pressure of from one to 30 atmospheres, and a reaction time of 20 minutes to 50 hours.

A decided advantage of our invention is the mild conditions necessary for conversion. A second decided advantage of our invention is the unique properties of the products obtained. A third is that a judicious choice of this wide range of experimental conditions available lends ease to the control of the rate of reaction, and makes the process applicable to a large number of starting materials.

The use of the process of this invention results in the formation of essentially long chain polymers having many useful properties not obtainable heretofore. Illustrative examples of these products and of their properties are given below.

The acetylenic compounds which can be polymerized by this process are acetylene itself, or any acetylenic hydrocarbon having a terminal triple bond. The general formula of the acetylene reactant is:

$$H-C\equiv C-R$$

R can be: (1) hydrogen, (2) a hydrocarbon moiety, saturated or unsaturated, aliphatic, alicyclic or aromatic, having one to 12 carbon atoms, substituted or unsubstituted, (3) a functional group such as $CH_2OH$, $CHO$, $COOH$, (4) functional groups such as ketone, amine, ester, and ether, or the like, having one to 12 carbon atoms. Of the various acetylenic materials available, it is preferred to use acetylene, propargyl alcohol or terminally triple bonded acetylenic hydrocarbons containing three to twelve carbon atoms.

A heterocyclic amine, which is aromatic in character, is a necessary component in the process. Attempts to utilize other types of amines have only met with failure. The heterocyclic aromatic amine forms the reactive complex with the nickel catalyst, and when present in sufficient quantities, also acts as a solvent for other reactants.

Successful operation of the process can be affected when one or a combination of the following amines is used. However, this list is illustrative and not limiting in character.

| Compound Type | Examples |
| --- | --- |
| Five-membered rings containing one nitrogen atom. | Pyrroles, indoles. |
| Five-membered rings containing two nitrogen atoms. | Imidazoles, pyrazoles. |
| Five-membered rings containing three nitrogen atoms. | 1,2,3-triazoles, 1,2,4-triazoles. |
| Six-membered rings containing one nitrogen atom. | Pyridines, lutidines. |
| Six-membered rings containing two nitrogen atoms. | Pyridazines, pyrimidines, pyrazines. |
| Six-membered rings containing three nitrogen atoms. | 1,2,3-triazines, 1,2,4-triazines. |
| Polycyclic aromatic hydrocarbons where one ring contains one nitrogen atom. | Acridines, quinolines, isoquinolines. |
| Polycyclic aromatic amines where two or more rings contain nitrogen atoms. | 4,7-phenanthrolines, 1,10-phenanthrolines. |
| Polycyclic aromatic hydrocarbons where one ring contains two nitrogen atoms. | Cinnolines, phenazines, quinazolines, quinoxalines. |

The organo-nickel compounds utilized in this invention are true catalysts, since they produce at least 50 times their weight of polymer. These compounds, which must contain at least one nickel carbon bond, are necessary in the process. Various classes of these compounds have been found satisfactory. However, all of these compounds have a common characteristic in that they all contain at least one nickel-to-carbon bond. The following list is illustrative but not limiting.

A preferred embodiment of this invention is the production of essentially linear polymers from acetylenic hydrocarbons having a terminal triple bond, by reaction of the starting materials in the presence of a heterocyclic amine having aromatic character, and a nickel catalyst containing at least one nickel-carbon bond. In order to produce soluble polymers by this process it is necessary to use conditions of temperature and pressure less strenu-

| | |
|---|---|
| Dicyclopentadienyl nickels | Dicyclopentadienylnickel, dimethylcyclopentadienylnickel. |
| Derivatives of dicyclopentadienyl nickel where one ring is replaced by another ligand, such as nitrosyl, and moieties having an allylic configuration, as allyl and cyclopentenyl. | Cyclopentadienylnickelnitrosyl, cyclopentadienylnickel cyclopentenyl. |
| Bis(cyclopentadienyl nickel) acetylenes | Bis(cyclopentadienyl nickel) acetylene, bis(methylcyclopentadienylnickel) acetylene. |
| Simple and complex nickel cyanides | Nickel(I)cyanide, potassium tetracyanonicolate (II). |
| Trialkyl and triaryl phosphine, arsine and stibine nickel carbonyls. | Tricarbonyl(triphenylphosphine) nickel, tricarbonyl(triphenylarsine) nickel. |
| Polynuclear nitrogenous heterocyclic nickel carbonyls. | Dicarbonyl(2,2'-bipyridine) nickel, dicarbonyl(benzo[C]cinnoline) nickel. |
| Alkyl and aryl isocyanides of nickel and nickel carbonyls. | Carbonyltris(methyl isocyanide) nickel, tetrakis(phenyl isocyanide) nickel. |
| Trialkyl and triaryl phosphite nickel carbonyls. | Dicarbonyl bis(triphenyl phosphite) nickel, dicarbonyl bis(triethyl phosphite) nickel. |
| Phosphorus trichloride nickel carbonyls | Dicarbonyl bis(phosphorus trichloride)nickel, tricarbonyl(phosphorus trichloride)nickel. |
| Arylene bis(phosphine nickel) carbonyls | Dicarbonyl(o-phenylenebisphosphine)nickel, dicarbonyl(o-phenylene bis(diethylphosphine))nickel. |

It is preferable to use the "sandwich" compounds dicyclopentadienylnickel, and cyclopentadienyl cyclopentenyl nickel. Cyclopentadienyl nickel nitrosyl and bis (cyclopentadienylnickel) acetylene are also preferred. Nickel carbonyl has been found to effect the reaction; however, the reaction rate is very rapid and the reaction tends to be difficult to control.

New compositions of matter are formed in this process. The new polymers are essentially linear and have a wide range of mass distribution. Polymers having a molecular weight of over 1000 are readily obtainable. The products of this invention have a high degree of unsaturation. They are soluble in common organic solvents, e.g., benzene, pyridine, carbon tetrachloride, chloroform, and acetone. Indeed, the polymers produced in this process are the first known high molecular weight polyacetylenes soluble in organic solvents. The polymers oxidize rapidly in air. Most of the sample is rendered insoluble when exposed to air for 4 to 5 hours. All of the sample became insoluble when kept in air overnight. Starch iodide tests show the presence of peroxides in the exposed polymer. Infrared spectrophotometric examination demonstrated the presence of hydroxyl and carbonyl groups in the exposed polymer. The polymers are reactive to chlorine and hydrogen chloride.

A preferred class of products obtained by the process of this invention are those polymers having a molecular weight between 500 and 20,000. Said polymers are soluble in organic solvents and have a high degree of unsaturation. The preferred class of polymers fuses at 180–200° C. to form a plastic which can be molded. The polymers have an extremely high electrical resistance. They have utility as drying oils in paints and varnishes and as microwave absorbers.

ous than the reaction conditions when separating the products from the final reaction mixture. The conditions are preferably as mild as economically feasible. The amount of cross-linking and consequent loss of solubility varies proportionally with the vigor of the conditions used in isolation. Another preferred embodiment is the working up of the final reaction mixture by removal of the volatile components under reduced pressure at low temperatures. Another is the precipitation of the polymer by addition of the reaction mixture to a solvent in which the polymer is insoluble, e.g., water and methanol.

This invention can be better understood by a study of the following examples. All amounts are given in parts by weight.

*Example I*

In a suitable reaction vessel, previously flushed with nitrogen, equipped with heating means, stirring means, condensing means, and a gas bubbler, one part of dicyclopentadienyl nickel was dissolved in 500 parts of pyridine. Acetylene was bubbled into the stirred solution at a slow rate for 16 hours. During this time the reaction mixture was maintained at 70±5° C. and at atmospheric pressure under $N_2$. The reaction mixture was filtered to remove minor amounts of solid impurity. The filtrate was evaporated at room temperature and at reduced pressure. The solid material remaining as a residue was soluble in benzene, chloroform, carbon tetrachloride and tetrahydrofuran, partially soluble in acetone and ether and insoluble in petroleum ether and methanol. Elemental analysis of the polymer obtained gave the following results: carbon, 91.5 percent, hydrogen, 7.79 percent, agreeing well with the theoretical value for a polyacetylene. The molecular weight as determined by the cryoscopic technique is approximately 1300. This agrees well with the ebullioscopic determination which yielded a result of approximately 1250.

*Example II*

In a suitable reaction vessel equipped with heating means, condensing means, stirring means, and a gas bubbler, 0.5 part of dicyclopentadienylnickel was dissolved in 300 parts of pyridine under pp-nitrogen. The mixture was heated to 70° C. and acetylene was bubbled into the stirred solution at a slow rate. During the reaction, a protective atmosphere of $N_2$ (1 atmosphere pressure) was employed. A Dry Ice-acetone trap was connected to the condenser to trap any low boiling exhaust gases. No vinyl acetylene was found in the exhaust gases by vapor phase chromatography after forty-five minutes reaction time. After five hours, the exhaust gases contained 0.73 percent vinyl acetylene. After 16 hours the exhaust contained 1.4 percent vinyl acetylene. The acetylene values obtained by the three analyses were 75 percent, 86 percent and 91 percent respectively. A colorless liquid in the Dry Ice trap after 16 hours of elapsed reaction time contained 78 percent vinyl acetylene. The dark brown reaction mixture was poured into 200 parts of water and a brown solid separated. The aqueous phase was extracted with ether. After removal of the ether, a brown polymer was obtained. By suitable analyses, this polymer was demonstrated to be identical with that isolated in Example I.

*Example III*

One part of bis(cyclopentadienylnickel)acetylene was dissolved in 540 parts of pyridine under nitrogen, and charged into a suitable stainless steel autoclave equipped with heating means, stirring means, and temperature means. The clave was flushed with nitrogen and 100 parts of butadiene was injected. The clave was pressured to 100 p.s.i. with acetylene and stirred and heated at 100° C. for two hours. The pressure attained 260 p.s.i. but rapidly dropped to 65 p.s.i. After cooling, the vessel was discharged and the reaction mixture placed into a suitable vessel. The solvent was removed at 0.1 mm. and 60° C.

The tarry residue was triturated with petroleum ether and dichloromethane. The polymer obtained was dried with acetone. The polymer did not contain nickel and was identical with the products obtained in the previous examples.

*Example IV*

(Cyclopentadienyl-cyclopentenyl)nickel, one part, was dissolved in 200 parts of pure dry pyridine. The mixture was prepared in a suitable reaction vessel equipped with heating means, condensing means, and stirring means. Dry acetylene was bubbled through the solution initially maintained at 70° C. for one hour and finally at 60° C. for 15 hours. A protective atmosphere of $N_2$ was used during the reaction. The vent gases were trapped in a Dry Ice-acetone trap and were demonstrated to contain acetylene, vinyl acetylene, and small amounts of butadiene by vapor phase chromatographic analysis. The reaction mixture was cooled and filtered. The solvent in the filtrate was removed at reduced pressure and room temperature. The residue was completely soluble in benzene and partially soluble in petroleum ether. The polymeric residue was identical to that product obtained above.

*Example V*

Cyclopentadienyl nickel nitrosyl, 1.5 parts, was dissolved in 600 parts of dry distilled pyridine and the solution was charged into a suitable stainless steel autoclave equipped with heating means, a pressure measuring means, and gas introduction and exhaustion means. The autoclave was swept with nitrogen and pressured to 105 p.s.i. with acetylene at room temperature and heated to 70° C. Over a period of 45 minutes the pressure dropped from 200 to 60 p.s.i. The autoclave was repressured 4 times at 70° C. After approximately four hours of heating time the clave was cooled to room temperature and discharged. The reaction mixture was filtered. All solvent material was removed at reduced pressure. The tarry residue was completely soluble in benzene. Analysis proved the identity of this product with those obtained previously.

*Example VI*

One part of bis(cyclopentadienylnickel)acetylene was dissolved in 600 parts of pyridine under pp-nitrogen, and the dark green solution poured into a suitable stainless steel autoclave equipped with stirring means, gas inlet and discharge means and a pressure gauge. The clave was then flushed with nitrogen and pressured to 100 p.s.i. with acetylene with stirring. The clave was then heated at 80° C. for 5 hours. The clave was re-pressured to 100 p.s.i. with acetylene three times during this reaction period. The clave was discharged into a suitable reaction vessel and the solvent was then removed to obtain the product using the techniques described above.

*Example VII*

Two parts of anhydrous nickel cyanide was dispersed in 550 parts of pyridine and the solution charged into a stainless steel autoclave equipped with heating means, pressure measuring means, and gas introduction and exhaustion means. The clave was swept with nitrogen and pressure to equilibrium with tank acetylene. The clave was heated at 70° C. for 21 hours and a pressure drop from 350 to 45 p.s.i. was observed. Upon cooling, the reaction mixture was filtered and the solvent removed at room temperature and at reduced pressure. The isolated tar was triturated with low boiling petroleum ether. The liquid phase was decanted and a resinous solid was isolated. The solid was freeze dried to remove occluded benzene. The petroleum ether was removed from the triturate under reduced pressure and a tarry residue was obtained. This residue was sublimed at 50° C. and 0.05 mm. The products obtained were a greenish oil and a soft brown resinous solid. The solid was proven to be identical with the polymers described above.

The pyridine originally evaporated from the reaction mixture was poured into water and the aqueous phase extracted with low-boiling petroleum ether. After careful removal of the petroleum ether in the cold and under reduced pressure, 10 parts of a brown mobile liquid was isolated. Mass spectrometric analysis of the liquid indicated the presence of benzene and vinyl substituted derivatives thereof.

*Example VIII*

Into a vessel made of stainless steel with gas inlet and outlet ports and equipped with heating means, pressure means, and stirring means is placed 50 parts of 3-methyl phenyl acetylene, 700 parts of acridine, and one part of cyclopentadienyl-cyclopentenyl nickel. The vessel is pressured to 100 p.s.i. with nitrogen. The mixture is heated to 130° C. for 25 hours. After cooling, the vessel is discharged and the solvent is removed at reduced pressure, at 110° C. The residual polymer is analogous to the polymers previously described. By using the conditions given in the following table, similar polymers are prepared from the monomers listed in column 1.

TABLE

| Monomer | Catalyst | Amine | Vessel | Temp., ° | Pressure, p.s.i. | Time, hrs. | Work-up | Protective Atmosphere | Ratio parts by weight monomer: catalyst: solvent | Remarks |
|---|---|---|---|---|---|---|---|---|---|---|
| 4-methyl-5-[1,2-cyclohexyl] pentyne. | NiCN | Pyrimidine | Stainless steel autoclave. | 120 | 50 | 10 | Reduced pressure distillation. | $N_2$ | 50:1:700 | |
| Do | $K_2Ni(CN)_4$ | Quinoxaline | ___do___ | 120 | 50 | 10 | ___do___ | $N_2$ | 50:1:700 | |
| Propargyl butyrate. | Tricarbonyl(triphenylphosphine)nickel. | Quinoline | ___do___ | 130 | 100 | 10 | ___do___ | $N_2$ | 50:1:700 | Pressured c $N_2$. |
| 3-methyl phenyl acetylene. | Dicarbonyl(2,2'-bipyridine nickel). | Phthalazine (50) plus quinazoline (50). | ___do___ | 130 | 100 | 25 | ___do___ | $N_2$ | 50:1:700 | Do. |
| Acetylene | Carbonyltris(methyl isocyanide)Ni. | Pyridine | ___do___ | 130 | 300 | 1 20 | Thrown out with methanol. | $N_2$ | *:1:600 | |
| Propiolic acid | Dicarbonyl bis(triphenylphosphite)Ni. | Phenanthridine | ___do___ | 80 | 50 | 50 | Reduced pressure distillation at 115°. | $N_2$ | 50:1:600 | Do. |
| Acetylene | Dicarbonyl bis(phosphorus trichloride)Ni. | 1,2,3-triazine | ___do___ | 80 | 50 | 20 | Reduced pressure distillation at 75°. | $N_2$ | *:1:600 | |
| Do | Dicarbonyl(o-phenylene biphosphine) nickel. | Pyrazine 75, benzene 25. | ___do___ | 80 | 150 | 15 | ___do___ | $N_2$ | *:1:600 | |
| Do | Dicyclopentadienyl nickel. | Pyrazole | ___do___ | 70 | 100 | 15 | ___do___ | $N_2$ | *:1:600 | |
| Do | Cyclopentadienyl nickel nitrosyl. | 1,10-phenanthroline | ___do___ | 175 | 200 | 10 | Reduced pressure distillation at 175°. | $N_2$ | *:1:900 | |
| Do | Dicyclopentadienyl nickel. | Phenazine | ___do___ | 175 | 250 | 15 | ___do___ | $N_2$ | *:1:900 | |
| Do | Dicyclopentadienyl nickel. | Cinnoline | ___do___ | 130 | 50 | 20 | Reduced pressure distillation at 40°. | $N_2$ | *:1:600 | |

1 Minutes.
*When the monomer employed is acetylene, the vessel is pressurized and repressurized during the course of the reaction to the indicated pressure. The vessel is repressurized 1-4 times.

*Example IX*

A solution of 40 parts of propargyl alcohol in 300 parts of pyridine containing one part of dicyclopentadienyl nickel was refluxed for 7 hours in a suitable reaction vessel continuously flushed with nitrogen, equipped with heating means and condensing means. After cooling, the solvent was removed at reduced pressure. A dark brown viscous oil was isolated. A solid by-product was removed from this oil by dissolution in 32 parts of methanol followed by addition of 32 parts of petroleum ether. Removal of solvent from the filtrate yielded a brownish oil.

A solid, $(C_3H_4O)_2$, was removed from this oil by sublimation at 0.05 mm. Hg and 65° C. A greenish oil, C, 63.8 percent, H, 7.34 percent was also removed in the sublimation procedure. The residue of the sublimation was triturated with acetone and a gray-brown solid removed by filtration. Removal of the solvent from the filtrate yielded polymerized propargyl alcohol as a brown oil. Analysis confirmed that the product was analogous to the products previously described.

*Example X*

Seventy parts of 1-pentyne was dissolved in dry pyridine containing one part of dicyclopentadienyl nickel. The solution was charged into a suitable stainless steel autoclave previously swept with nitrogen, equipped with heating means, and gas discharge means. The clave was heated at 100° C. for 20 hours. On cooling all volatiles were removed under reduced pressure and room temperature. A dark brown oily residue was obtained. Solution of the oily residue in low boiling petroleum ether followed by chromatography on alumina separated a 1-pentyne trimer and azulene from the impure product. The oily residue, after being chromatographed, was similar to those previously described.

The polymers prepared by the method described above contain many reactive unsaturated linkages. By simple addition of radicals across these multiple bonds, new compositions of matter having new and useful properties are readily obtainable. An illustrative but not limiting list of addends includes halogen, hydrohalides, hypohalous acids, performic, perbenzoic and sulfuric acid, hydrogen and hydroxide groups. The following are examples of addition reactions.

*Example XI*

A solution of two parts of polymer produced by the procedure in Example I in 275 parts of carbon tetrachloride was charged into a suitable reaction vessel equipped with a gas bubbler. Chlorine gas was bubbled into the reaction for approximately three hours until the mixture was colored a light yellow. A solid was removed by filtration. This product was analyzed and found to contain 49.4 percent chlorine and is a chlorinated polyacetylene.

*Example XII*

In an autoclave equipped with heating means, pressure regulating means and gas inlet and exhaust, a solution of 6.65 parts of polymer obtained by our process and 240 parts of benzene were flushed with nitrogen and then pressured with 53 parts of hydrogen chloride. The reaction was heated at 50° C. for approximately 5½ hours. The clave was discharged and the reaction mixture filtered. Only a trace amount of residue was present. The solvent, which had a blue color, was stripped at aspirator pressure; during this operation the blue color disappeared. The brown residue was dissolved in 58 parts of methanol. A brown chlorinated polymer was isolated. This brown solid contained 20.3 percent chlorine. The virtually complete disappearance of olefinic groups was demonstrated by infrared spectrophotometry. The product was a chlorinated polyacetylene.

Example XIII

In a reaction vessel equipped with heating means, stirring means and condensing means, 4 parts of a polymer produced by our process were dissolved in approximately 130 parts of formic acid at room temperature, and 18.15 parts of 30 percent hydrogen peroxide were added to the mixture over a 15-minute period. Subsequently, the reaction mixture was kept at about 40° C. using a water bath for a period of 3 hours and then the reaction mixture was allowed to stir overnight at room temperature. After this time the reaction mixture gave a negative test for peroxides. Water was added to the reaction mixture and a yellow-brown precipitate was formed. After filtration and washing the residue with water, one part of the sample was treated with 20 parts of 10 percent sodium hydroxide. The infrared spectrum of the original material had a peak about 1,700 cm.$^{-1}$. It did not show double bond absorptions. The material obtained from treatment with base showed bands about 1600 cm.$^{-1}$ and its spectrum was quite similar to that of polyacetylene.

Other derivatives of the polymers produced by the process of this invention were prepared as follows.

*Bromopolyacetylenes.*—Bromine derivatives of polyacetylene were prepared by addition of 5.37 parts of the polyacetylene and 3.06 parts of bromine to 80 parts of benzene and allowing the mixture to stand in the dark for two days at room temperature. Three product fractions were obtained. The first fraction precipitated on standing. The second fraction precipitated on addition of two volumes of methanol to one volume of the benzene solution. The third fraction precipitated on further addition of a large excess of methanol. All of these fractions were bromopolyacetylenes. The fractions were soluble in tetrahydrofuran.

*Chlorohydrin derivative.*—A solution of 5.37 parts of polyacetylene in 100 parts of benzene was placed into a suitable reaction vessel equipped with two dropping funnels, nitrogen inlet means, and stirring means. The solution was cooled to 10° C. and was then buffered with 100 parts of an aqueous solution, 0.14 molar in $Na_2HPO_4$ and 0.14 molar in $NaH_2PO_4$. Sodium hypochlorite, 10.3 parts, in 415 parts of water was added over a period of 45 minutes along with 13 more parts of $NaH_2PO_4$. The final pH of the reaction mixture was six. The polymeric product precipitated during the reaction. Hydrochloric acid was then added until a pH of three was obtained. Sodium bisulfite was added and the precipitated polymer was washed with water and methanol, and stored in a methanol slurry because it tended to insolubilize on standing in air. This derivative was soluble in tetrahydrofuran and was heat stable.

*Epoxy derivative.*—The chlorohydrin derivative was dissolved in tetrahydrofuran. A 125 percent excess of sodium hydroxide pellets was added slowly over a period of one hour while maintaining the temperature between 30 and 40° C. Additional water and methanol was added to dissolve the sodium hydroxide. Upon the addition of water, the brown product precipitated in colloidal form. The polymer was precipitated by centrifugation. A portion of the product was dried whereupon it became black, cross linked, and insoluble. The remainder of the product was stored in a methanol slurry to overcome the tendency to insolubilize.

*Hydroxyl derivative.*—The epoxidized polyacetylene was dispersed in water and sulfuric acid was added to a pH of three. The slurry was then heated on a steam bath for 8 hours with stirring. On cooling, the product, the hydroxyl derivative, settled out. This polymer was soluble in water-methanol mixtures.

The polymers produced by the process of this invention, when heated rapidly, fuse at 180–200° C. and in this condition are able to be molded. The ease of oxidation and the solubility of the polymers can be used to advantage in various applications, such as drying oils of paints and hardening of polyesters. The polymers produced by our process also find application as semi-conductors, cross linking agents, rocket fuel binders, as lubricant additives, structural materials, and plasticizers.

The process of this invention is applicable to a wide variety of acetylenic hydrocarbons. A criterion, however, which must be observed when choosing the monomer is that the triple bond must be in the terminal position. Although the process is applicable to all hydrocarbons having a terminal triple bond, it is preferred to use those that have up to 12 carbon atoms.

To obtain soluble polymers, the operating conditions must not be too strenuous. It is preferred to use a temperature range of 50° to 150° C., a pressure of one to 25 atmospheres, and a reaction time of 20 minutes to 60 hours. A shorter time than 20 minutes can be used but the yields are poor. What operating conditions are necessary for a given starting product, catalyst and heterocyclic amine, will be obvious to one skilled in the art after a careful reading of the examples given above.

The catalyst must be a nickel catalyst containing at least one nickel-carbon bond. The sandwich compounds, dicyclopentadienyl nickel and cyclopentadienyl cyclopentenyl nickel are very satisfactory as are the compounds bis(cyclopentadiene nickel)acetylene and cyclopentadienylnickel nitrosyl. Nickel compounds, having substituents on the rings can also be used. The cheaper compound, nickel cyanide, is also operative, however, the rate of polymerization is slower when this compound is used. Ferrocene cannot be substituted for a nickel compound. A catalyst of choice is a compound which will give the desired reaction rate and will not be consumed by an anomalous side reaction.

There is evidence that the nickel catalyst forms a labile complex with the aromatic amine during the process. For example, as soon as the temperature is raised to the proper reaction temperature there is a color change evidenced in the solution. Secondly, when bis(cyclopentadienylnickel)acetylene was added to pyridine and the mixture heated to 60° C., acetylene gas appeared in the atmosphere above the solution and the solution turned a dark brown. Thirdly, the desired reaction does not occur unless a heterocyclic amine is present. When dimethyl aniline or triethyl amine was substituted for the heterocyclic amine, the results met with failure. Consequently, it is believed that this nickel amine complex is necessary in the operation of this invention.

The solvent must be a heterocyclic amine or a solution of a heterocyclic amine. The amine must not decompose or form tars under the reaction conditions. Amines which are solid at room temperature are utilizable if they are liquid at the reaction temperature or are sufficiently soluble in a solvent to effect the reaction. The effectiveness of the catalyst can be reduced by varying the solvent. Thus, if pyridine contains approximately 35 percent water, there will be no polymerization of acetylene when dicyclopentadienyl nickel is used as a catalyst and the reaction is carried out at 70° C. When the same system is maintained at 100° C. in an autoclave, only partial polymerization occurs. The nature of the inhibition by water is not known.

Eight volume percent solutions of pyridine in petroleum ether are inoperative. However, up to 25 volume percent of methanol in pyridine does not markedly inhibit the polymerization of acetylene. Hydroquinone does not completely inhibit the polymerization when it is present in the reaction mixture. The exact function of the amine is unknown but it probably plays a dual role of forming labile nickel complexes and then keeping them in solution as effective catalytic agents. It is preferred to use dry distilled pyridine as the amine. Most of the common aliphatic organic solvents can be utilized as an amine diluent in our process. However, two criteria must be followed when selecting the solvent to be used. The amine must be soluble to the extent that the final solution contains 75 percent of the amine and the solvent must be stable under the reaction conditions. Methanol, and dimethylcarbitol are illustrative but not limiting examples of the solvents which can be employed. To obtain the soluble polyacetylenes, the solvent must be removed from the product at reduced pressure using low temperature or by some other mild treatment such as precipitating out the product by addition of the reaction mixture to a large volume of water or methanol.

From Example II it is apparent that the extent of the reaction can be followed by analysis of the exhaust gases. The properties of the product can be altered by addition reactions of the unsaturated carbon bonds present in the polymers. For example, chlorination, hydrochlorination, and reaction with performic acid results in new compositions of matter having new and useful products.

The amount of chlorine taken up by the polymer was found to be time dependent. For example, if the conditions in Example XIV are essentially maintained except the chlorination is carried out for six hours, the product will contain 55.4 percent chlorine. The chlorinated derivative, besides being soluble, is also infusible.

Chlorinated polyacetylene can be used in a high temperature thermoplastic composition. One hundred parts of Monsanto Opalon polyvinyl chloride and 10 parts of National Lead Dythal dibasic lead phthalate were fused on a 2-roll mill at 149° C., and 200 parts of chlorinated polyacetylene was added gradually. The dark sheet was removed from the rolls and molded to form a thick disc. Samples of polyvinyl chloride, Goodrich Geon Hi-Temp "polyvinyl dichloride," and vinylidene chloride/ethyl acrylate 98/2 copolymer was also molded into discs. These were then tested for Vicat heat distortion temperature. The temperatures indicated are the temperatures at which the needle penetrated the samples to the depth indicated. The heat distortion temperature is a measure of the tendency of the material to soften upon exposure to heat. High temperature values are desirable when the material is to be used as an insulator.

ant polyacetylene can be regenerated by reaction with base.

Having fully described the novel polymers of the present invention, the need therefor, and the methods for their preparation, we intend that our invention be limited only by the scope of the appended claims.

We claim:
1. A process for polymerizing an acetylenic compound having a terminal triple bond, said process comprising: (1) reacting a heterocyclic amine having aromatic character, said amine being selected from the class consisting of pyrrole, indole, imidazole, pyrazole, 1,2,3-triazole, 1,2,4-triazole, pyridine, lutidine, pyridazine, pyrimidine, pyrazine, 1,2,3-triazine, 1,2,4-triazine, acridine, quinoline, isoquinoline, 4,7-phenanthroline, 1,10-phenanthroline, cinnoline, phenazine, quinazoline and quinoxaline, with a catalyst, said catalyst being selected from the class consisting of nickel cyanide and potassium tetracyanonickolate (II) to prepare a reactive mixture comprising at least 75 percent by volume of said heterocyclic amine and the reaction product of said amine with said catalyst, any remaining portion of said reactive mixture being an inert organic solvent, the amount of said catalyst being at least 1/50 the weight of said acetylenic compound, and (2) contacting said acetylenic compound with said reactive mixture at a temperature within the range of from about 50 to about 150° C.

2. A process for polymerizing an acetylenic compound having a terminal triple bond, said process comprising: (1) reacting a heterocyclic amine having aromatic character, said amine being selected from the class consisting of pyrrole, indole, imidazole, pyrazole, 1,2,3-triazole, 1,2,4-triazole, pyridine, lutidine, pyridazine, pyrimidine, pyrazine, 1,2,3-triazine, 1,2,4-triazine, acridine, quinoline, isoquinoline, 4,7-phenanthroline, 1,10-phenanthroline, cinnoline, phenazine, quinazoline and quinoxaline, with a catalyst, said catalyst being an organonickel compound having at least one radical embodying the general configuration of the cyclopentadienyl radical bonded to a nickel atom said organo nickel compound being selected from the class consisting of dicyclopentadienyl nickel, dimethylcyclopentadienyl nickel, cyclopentadienyl nickel

| Composition | Chlorine Content, Percent | Shore D Hardness | Vicat Heat Distortion [1] Temperatures (° C.) at Deflections of— | | | |
|---|---|---|---|---|---|---|
| | | | 10 mils | 20 mils | 30 mils | 40 mils |
| Vinylidene Chloride/Ethyl Acrylate 98/2 | 73 | 86 | 162 | 164 | 164 | 164 |
| 2 Chlorinated Polyacetylene plus 1 Polyvinyl Chloride [2] | 52 | 87 | 127 | 130 | 133 | 136 |
| Geon Hi-Temp | ? | 84 | 124 | 128 | 131 | 133 |
| Polyvinyl Chloride | 57 | 85 | 87 | 102 | 116 | [3] 116 |

[1] ASTM D-1525-58-T. Specimens in white mineral oil. Temperature rise 50° C./hour. 1,000 gm. on penetration needle=1,420 p.s.i.
[2] Melting point, 225° C.
[3] ASTM molded bar heat distortion temperature approximately 74° C.

The blend of chlorinated polyacetylene with polyvinyl chloride was slightly superior to Goodrich's commercially successful Hi-Temp "polyvinyl dichloride." These results demonstrate that the blend of chlorinated polyacetylene and polyvinyl chloride is a highly effective insulator for hot fluid conduits.

The solubility of the products of this invention makes them excellent agents for impregnating paper and other fibrous materials. The polyacetylene films, upon aging, contain hydroxyl and carbonyl groups in large quantities. These groups undoubtedly contribute to adhesion of the polymers to a substrate. These groups can also contribute to adhesion of other polymers when the products of our invention and other polymers are used as blends.

The product of the reaction between polyacetylene and performic acid is remarkable because the original reactnitrosyl, cyclopentadienyl nickel cyclopentenyl, bis(cyclopentadienyl nickel) acetylene and bis(methylcyclopentadienyl nickel) acetylene, to prepare a reactive mixture comprising at least 75 percent by volume of said heterocyclic amine and the reaction product of said amine with said catalyst, any remaining portion of said reactive mixture being an inert organic solvent, the amount of said catalyst being at least 1/50 the weight of said acetylenic compound, and (2) contacting said acetylenic compound with said reactive mixture at a temperature within the range of from about 50 to about 150° C.

3. Process for polymerizing acetylene, said process comprising dissolving bis(cyclopentadienyl) nickel in pyridine and contacting acetylene with the reactive mixture thereby produced, at a temperature of from about 50 to 150° C. and such that the amount of said bis(cyclopentadienyl) nickel is at least 1/50 the weight of said acetylene contacted with said reactive mixture, said reactive mixture comprising at least 75 percent by volume of pyridine and the reaction product of pyridine with said nickel compound, any remaining portion of said reactive mixture being an inert organic solvent.

4. A process for the polymerization of acetylene, said process comprising: (1) preparing a reactive mixture by dissolving bis(cyclopentadienyl nickel) acetylene in pyridine and (2) contacting acetylene with the reactive mixture thereby produced, at a temperature within the range of from about 50 to 150° C. and such that the amount of said bis(cyclopentadienyl nickel) acetylene is at least 1/50 the weight of said acetylene contacted with said reactive mixture, said reactive mixture comprising at least 75 percent by volume of pyridine and the reaction product of pyridine with said nickel compound, any remaining portion of said reactive mixture being an inert organic solvent.

5. Process for the polymerization of acetylene, said process comprising: (1) preparing a reactive mixture by dissolving cyclopentadienyl (cyclopentenyl) nickel in pyridine and (2) contacting acetylene with the reactive mixture thereby produced, at a temperature within the range of from about 50 to 150° C. and such that the amount of said cyclopentadienyl (cyclopentenyl) nickel is at least 1/50 the weight of said acetylene contacted with said reactive mixture, said reactive mixture comprising at least 75 percent by volume of pyridine and the reaction product of pyridine with said nickel compound, any remaining portion of said reactive mixture being an inert organic solvent.

6. A process for polymerizing acetylene, said process comprising: (1) preparing a reactive mixture by dissolving cyclopentadienyl nickel nitrosyl in pyridine and (2) contacting acetylene with the reactive mixture thereby produced, at a temperature within the range of from about 50 to 150° C. and such that the amount of said nickel nitrosyl is at least 1/50 the weight of said acetylene contacted with said reactive mixture, said reactive mixture comprising at least 75 percent by volume of pyridine and the reaction product of pyridine with said nickel compound, any remaining portion of said reactive mixture being an inert organic solvent.

7. Process for polymerizing acetylene, said process comprising: (1) preparing a reactive mixture comprising a solution of nickel cyanide in pyridine and (2) contacting acetylene with the reactive mixture thereby produced, at a temperature within the range of from about 50 to 150° C. and such that the amount of said nickel cyanide is at least 1/50 the weight of said acetylene contacted with said reactive mixture, said reactive mixture comprising at least 75 percent by volume of pyridine and the reaction product of pyridine with said nickel compound, any remaining portion of said reactive mixture being an inert organic solvent.

8. Process for the polymerization of propargyl alcohol, said process comprising preparing a reactive mixture by dissolving dicyclopentadienyl nickel in pyridine and subsequently contacting propargyl alcohol with the reactive mixture thereby produced, at a temperature within the range of from about 50 to 150° C. and such that the amount of said dicyclopentadienyl nickel is at least 1/50 the weight of said alcohol contacted with said reactive mixture, said reactive mixture comprising at least 75 percent by volume of pyridine and the reaction product of pyridine with said nickel compound, any remaining portion of said reactive mixture being an inert organic solvent.

9. A process for the polymerization of 1-pentyne, said process comprising: (1) preparing a reactive mixture by dissolving dicyclopentadienyl nickel in pyridine and (2) contacting 1-pentyne with the reactive mixture thereby produced, at a temperature within the range of from about 50 to 150° C. and such that the amount of said dicyclopentadienyl nickel is at least 1/50 the weight of said pentyne contacted with said reactive mixture, said reactive mixture comprising at least 75 percent by volume of pyridine and the reaction product of pyridine with said nickel compound, any remaining portion of said reactive mixture being an inert organic solvent.

10. The process of claim 2 wherein said organonickel compound is dicyclopentadienyl nickel.

11. The process of claim 2 wherein said organonickel compound is cyclopentadienyl (cyclopentenyl) nickel.

12. The process of claim 2 wherein said organonickel compound is cyclopentadienyl nickel nitrosyl.

13. The process of claim 2 wherein said organonickel compound is bis(cyclopentadienyl nickel) acetylene.

References Cited by the Examiner

UNITED STATES PATENTS

| 2,743,264 | 4/1956 | Buselli et al. | 260—94.1 |
| 3,032,573 | 5/1962 | Meriwether et al. | 260—94.1 |
| 3,038,863 | 6/1962 | Balthis et al. | 252—431 |
| 3,055,839 | 9/1962 | Melchiore | 252—431 |
| 3,117,952 | 1/1964 | Meriwether | 260—94.1 |

OTHER REFERENCES

Dubeck, J. American Chem. Soc., vol. 82, p. 502 (1960).

JOSEPH L. SCHOFER, *Primary Examiner.*

HAROLD N. BURSTEIN, LEON J. BERCOVITZ,
*Examiners.*